United States Patent Office 2,961,429
Patented Nov. 22, 1960

2,961,429

POLYMERS CONTAINING EXTRALINEAR CYCLOBUTENE RINGS

John Lynde Anderson, Wilmington, Del., assignor to E. I. du Pont de Nemours and Company, Wilmington, Del., a corporation of Delaware No Drawing. Filed Aug. 16, 1955, Ser. No. 528,811

6 Claims. (Cl. 260—63)

This invention relates to polymeric materials. More particularly, it relates to a new class of linear polymers having extralineal substituents which crosslink when heated.

Linear polymers of various types are well known and many types have achieved commercial success. The thermoplastic properties and solubility in organic solvents of many of these polymers make them of particular value in various applications. However, polymers that are insoluble in organic solvents and have high softening points or are even infusible, are desired for use in certain applications. Heretofore such inert and infusible polymers have been obtained by crosslinking preformed linear polymers by the use of a separate crosslinking agent, or by methods involving the evolution of volatile by-products during the crosslinking step.

It is an object of this invention to provide novel linear polymers which can be crosslinked readily without separate crosslinking agents and without generating volatile by-products. Another object is to provide a process for preparing crosslinked polymers. A further object is to provide novel crosslinked polymers. Other objects of the invention will become apparent from the specification and claims.

In accordance with this invention a novel class of linear polymers is provided which crosslink readily upon heating to a temperature between 100° and 325° C. These polymers are wholly carbon chain linear addition polymers, but differ from previous polymers in that chain carbon of at least 1% of the recurring units of the polymer is joined to a cyclobutene ring through a linking group of the class —CO—NH—, —CO—O— and

—CO—NHC$_6$H$_4$—

The cyclobutene ring may have halogen or lower alkyl, i.e., alkyl of 1–8 carbons, substituents on annular carbons other than those linking the ring to the polymer chain, but at least two valences of these remaining annular carbons are satisfied by hydrogen and preferably there are two hydrogen atoms on one of the annular carbons. Any halogen substituents on the cyclobutene ring are only on unsaturated carbon. A maximum of eight carbons in all hydrocarbon substituents on the cyclobutene ring is preferred since a greater number of carbons in such substituents tends to render the cyclobutene ring less reactive in the crosslinking process.

The polymers of this invention are crosslinked by simply heating them to a temperature between 100° and 325° C. The crosslinking, which is believed to be due to the opening of the cyclobutene rings, takes place readily in this temperature range. The exact time required to crosslink the polymers is dependent on the particular temperature being employed, as well as on the composition of the particular polymer. At temperatures of 100–150° C. polymers comprising a large molar proportion of cyclobutene ring-containing monomer require more than five minutes to become crosslinked. At about 170–180° C. a five-minute heating period is sufficient, while at temperatures of 200–325° C. crosslinking is accomplished in less than one minute. However, when the polymer comprises only a small proportion of cyclobutene ring-containing monomer, longer times or higher temperatures are generally required. For example, a copolymer containing 5 mol percent of cyclobutene ring-containing monomer requires two minutes heating at 250° C. to become crosslinked, and one containing 15 mol percent of cyclobutene ring-containing monomer requires one minute at 200° C. At the lower temperatures mentioned above, polymers containing small proportions of cyclobutene rings in general require proportionally longer times of heating.

The polymers of this invention having a plurality of extralineal cyclobutene groups can be prepared by reaction of a preformed linear polymer having a wholly carbon chain and a plurality of functional groups, e.g., amino or hydroxyl groups, with a complementary reactant, e.g., an acid chloride, containing a cyclobutene ring of the type defined previously. Of course, the reaction conditions selected should be such that appreciable crosslinking of the polymers of this invention does not take place during the preparation of the polymer. This is accomplished by carrying out the preparation of the polymers at temperatures below 150° C. since higher temperatures cause more rapid crosslinking.

Crosslinking polymers of this invention can be prepared in a variety of ways from many known polymers having active hydrogen atoms, e.g., polymers containing hydroxyl or amino groups, by reaction with compounds having groups reactive with active hydrogens and having cyclobutene rings as part of their structure.

In the following examples, which illustrate preparation of specific embodiments of the products described, the proportions of ingredients are expressed in parts by weight unless otherwise noted.

Example I

A mixture of 60 parts of 2-bromo-1-cyclobutene-1-carboxylic acid and 500 parts of thionyl chloride is heated at reflux under nitrogen for 15 minutes. The excess thionyl chloride is then distilled off in vacuo (15 mm. mercury pressure) and the residue is dissolved in chloroform. One half of the chloroform solution of 2-bromo-1-cyclobutene-1-carboxylic acid chloride is mixed with 100 parts of poly-p-aminostyrene dissolved in 2000 parts of chloroform. After five minutes reaction at room temperature (about 25° C.), the reaction mixture is again divided into two halves and the chloroform removed from each portion by subjecting the solutions to a vacuum of 15 mm. mercury at room temperature. The residues are polymers having the following recurring structural units:

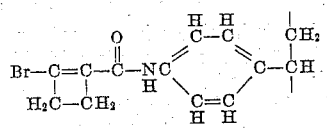

This polymer remains soluble in chloroform on storage at room temperature.

One portion of the polymer described in the preceding paragraph is heated at 172° C. for ten minutes. The resulting product is high melting and is insoluble both in chloroform and in benzene. This linear polyamide is useful for the preparation of molded articles and films which are convertible to highly crosslinked structures on heating.

The 2-bromo-1-cyclobutene-1-carboxylic acid used in this example is prepared by the method of Perkin, J. Chem. Soc., 65, 950–978 (1894), by treatment of 1,2- dibromo-1,2-cyclobutanedicarboxylic acid with barium hydroxide.

*Example II*

The other half of the chloroform solution of 2-bromo-1-cyclobutene-1-carboxylic acid chloride prepared as described in Example I is mixed with 100 parts of an ethylene/carbon monoxide polyamine (prepared by reductive amination of an ethylene/carbon monoxide polymer as described in U.S. Patent 2,495,255 to H. H. Hoehn) having the amino groups as lateral substituents on the polymer chain. The resulting polymer is worked up in the same manner as that described in Example I. The resulting linear polymer is soluble in both chloroform and benzene, and remains soluble on storage at room temperature. When the polymer is heated at 172° C. for ten minutes, a product is obtained which is insoluble in chloroform and benzene. The linear polymer is useful for the preparation of molded articles and films since it can be readily crosslinked by heating.

When the process of Example I is repeated with benzoyl chloride substituted for the 2-bromocyclobutene carboxylic acid chloride, there is obtained a polymer which is soluble in chloroform and which remains soluble in that solvent after heating at 172° C. for 30 minutes. This shows the critical nature of the cyclobutene ring in the polymer in effecting crosslinking at elevated temperatures.

*Example III*

The amino group of a polyamine prepared by reductive amination of an ethylene/carbon monoxide polymer is acylated with a cyclobutene ring-containing carboxylic acid chloride as follows. A solution of 1.3 parts of a 3:1 ethylene/carbon monoxide polyamine (prepared in accordance with the process described in U.S. Patent 2,495,255) in 30 parts of chloroform is mixed with 1.5 parts of 3-methyl-1-cyclobutene-1-carboxylic acid chloride at room temperature. The resulting polymer having recurring structural units of the formula

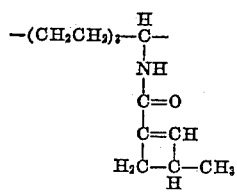

precipitates from solution. The polymer is resolubilized by the addition of 5 parts of pyridine, and the solution is stirred for 2 hours at 27° C. The solution is then subjected to vacuum at room temperature to remove the solvent. The resulting polymer is soluble in chloroform.

A portion of the polymer of the above Example III is heated under vacuum at 150° C. for one-half hour. The resulting product is insoluble in chloroform.

The methylcyclobutenecarboxylic acid chloride used in Example III is prepared from 1-methylene-3-cyclobutanecarbonitrile by the following series of reactions: 1-Methylene-3-cyclobutanecarbonitrile is hydrolyzed by aqueous alkali to the alkali metal salt of 1-methylene-3-cyclobutanecarboxylic acid. The salt is acidified with hydrochloric acid, and hydrogen iodide is added to the double bond. Treatment with alkali, followed by neutralization, gives the desired 3-methyl-1-cyclobutenecarboxylic acid. This acid is then treated with thionyl chloride to form the acid chloride.

Similar results are obtained when the procedure of Example III is repeated with the exception that the 3-methyl-1-cyclobutene-1-carboxylic acid chloride is replaced with an equivalent quantity of 1-methyl-1-cyclobutene-3-carboxylic acid chloride. In this case, the resulting polymer contains the following recurring structural units:

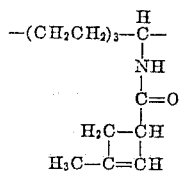

This polymer can be crosslinked by heating at 100°–325° C. The 1-methyl-1-cyclobutene-3-carboxylic acid chloride used in the preparation of the above polymer is prepared by reaction of hydrogen iodide with methyl 3-methylene-1-cyclobutene-1-carboxylate, followed by elimination of hydrogen iodide by means of a teriary amine, e.g., triethylamine, to form 3-carbomethoxy-1-methylcyclobutene. Addition of bromine to this cyclobutene gives the corresponding 1,2-dibromo-3-carbomethoxy-1-methylcyclobutane. This ester is hydrolyzed in the presence of acid, and the free acid is treated with potassium iodide in acetone to remove the bromine. The resulting 1-methyl-1-cyclobutene-3-carboxylic acid is converted to the acid chloride with thionyl chloride.

*Example IV*

A mixture containing 10 parts of polyvinyl alcohol, 3.86 parts of 1-methyl-1-cyclobutene-2,3-dicarbonyl chloride, 4.44 parts of triethylamine, and 200 parts of chloroform is stirred at room temperature for four hours. The resulting polymer, which is soluble in water, is filtered and washed with chloroform. The properties of the product indicate that it comprises polymer structural units of polyvinyl alcohol and polyvinyl esters of 1-methyl-1-cyclobutene-2,3-dicarboxylic acid. A film of this polymer, prepared by pressing at 250° C. and 550 lbs./sq. in. pressure, is found to be insoluble in water in contrast to the unheated polymer. This polymer can be crosslinked by heating at temperatures as low as 100° C.

Specific illustrations of crosslinking extralinear substituents have been given which show that the cyclobutene ring may be attached to the repeating unit by linking groups of the following types:

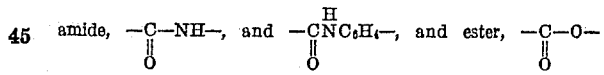

The ease with which the linear polymers of this invention crosslink makes them valuable in a variety of applications. Shaped articles can be formed in the usual manner for the corresponding linear polymers of the prior art which do not have extralinear cyclobutene rings. A simple heat treatment then changes the shaped polymers into a crosslinked polymer of greatly improved resistance to heat and solvent. In this manner shaped articles can be prepared which comprise substantially infusible and insoluble crosslinked polymer. The molecular weight of the polymer is increased by the crosslinking, so the linear form of polymer can be of relatively low molecular weight. This is frequently an advantage in preparing shaped articles or in applying coatings on surfaces.

The polymers of this invention are particularly useful when incorporated in printing inks since such inks can be set very rapidly by a heat treatment. This rapid setting of printing inks is important as a factor in obtaining increased printing rates on modern printing equipment. At the present time the rate of printing is controlled by the rate at which the ink sets on the printed sheet. Consequently, improvements in the rate of setting will increase the rate at which the machines can be operated.

Other applications of particular importance in which the polymers of this invention can be used include their use in the formation of finishes which can be very rapidly set by heat alone after being coated on various surfaces. The polymers are valuable adhesives, e.g., for bonding laminates, as the adhesive can be quickly set by simple heat-treatment. The thermoplastic nature of the adhesive before setting is a distinct advantage when forming shaped laminates. The polymers are also useful for the formation of fibers which can be crosslinked by heating to prevent shrinkage and to increase their solvent resistance.

Since many different embodiments of the invention may be made without departing from the spirit and scope thereof, it is to be understood that the invention is not limited by the specific illustrations except to the extent defined in the following claims.

What is claimed is:

1. A wholly saturated hydrocarbon chain linear addition polymer capable of crosslinking upon being heated above 100° C., said polymer being characterized by having chain carbon of from 1% to 100% of the recurring hydrocarbon chain units of the polymer joined to a cyclobutene ring through a linking group selected from the class consisting of —CO—NH—, —CO—O—, and —CO—NH—C$_6$H$_4$—, any substituent on said cyclobutene ring being selected from the class consisting of halogen and lower alkyl, said halogen substituent being only on unsaturated carbon of the cyclobutene ring and at least two valences of the remaining annular carbons of the cyclobutene ring being satisfied by hydrogen, any further substituent on the hydrocarbon chain being selected from the class consisting of hydroxyl and amino groups.

2. A crosslinked polymer obtained by heating a polymer of claim 1 to a temperature between 100° C. and 325° C.

3. Polymer, according to claim 1, having the recurring structural units

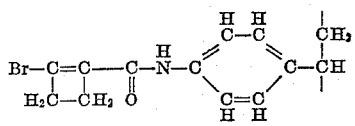

4. Polymer, according to claim 1, having the recurring structural units

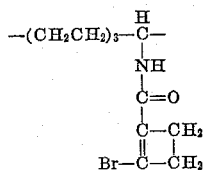

5. Polymer, according to claim 1, having the recurring structural units

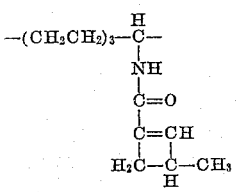

6. Polymer, according to claim 1, having the recurring structural units of polyvinyl alcohol and polyvinyl esters of 1-methyl-1-cyclobutene-2,3-dicarboxylic acid.

References Cited in the file of this patent

UNITED STATES PATENTS

| | | |
|---|---|---|
| 2,436,142 | Harmon | Feb. 17, 1948 |
| 2,462,347 | Barrick | Feb. 22, 1949 |
| 2,511,258 | Harmon | June 13, 1950 |